(12) United States Patent
Wong et al.

(10) Patent No.: US 10,445,865 B1
(45) Date of Patent: Oct. 15, 2019

(54) METHOD AND APPARATUS FOR CONVERTING LOW DYNAMIC RANGE VIDEO TO HIGH DYNAMIC RANGE VIDEO

(71) Applicant: TFI DIGITAL MEDIA LIMITED, Hong Kong (HK)

(72) Inventors: Hon Wah Wong, Hong Kong (HK); Hon Tung Luk, Hong Kong (HK); Chi Keung Fong, Hong Kong (HK); Yin Sze, Hong Kong (HK); Hok Kwan Cheung, Hong Kong (HK); Yiu Fai Yuen, Hong Kong (HK)

(73) Assignee: TFI DIGITAL MEDIA LIMITED, Hong Kong (HK)

( * ) Notice: Subject to any disclaimer, the term of this patent is extended or adjusted under 35 U.S.C. 154(b) by 79 days.

(21) Appl. No.: 15/936,459

(22) Filed: Mar. 27, 2018

(51) Int. Cl.
  *G06K 9/00* (2006.01)
  *G06T 5/00* (2006.01)
  *G06T 5/40* (2006.01)

(52) U.S. Cl.
  CPC .......... *G06T 5/009* (2013.01); *G06T 5/40* (2013.01); *G06T 2207/20208* (2013.01)

(58) Field of Classification Search
  CPC ......... G06T 5/009; G06T 5/001; G06T 5/007; G06T 5/40; G06T 5/20; G06T 5/50; G06T 2207/20208; G09G 5/02; G06K 9/40
  See application file for complete search history.

(56) References Cited

U.S. PATENT DOCUMENTS

| | | | |
|---|---|---|---|
| 6,879,731 B2 * | 4/2005 | Kang | G06T 5/50 250/205 |
| 7,558,436 B2 * | 7/2009 | Zuro | G06T 5/009 382/263 |
| 7,573,533 B2 | 8/2009 | Moldvai | |
| 8,050,512 B2 | 11/2011 | Daly et al. | |
| 8,233,738 B2 | 7/2012 | Rempel et al. | |
| 8,265,378 B2 | 9/2012 | Whitehead et al. | |
| 8,582,913 B2 | 11/2013 | Rempel et al. | |
| 8,784,318 B1 * | 7/2014 | Napolitano | G01S 7/52049 600/443 |
| 8,824,829 B2 | 9/2014 | Rempel et al. | |
| 8,948,537 B2 | 2/2015 | Rempel et al. | |
| 9,299,317 B2 * | 3/2016 | Ward | G06T 5/40 |
| 9,591,347 B2 * | 3/2017 | Morse | G11B 27/031 |
| 9,818,422 B2 * | 11/2017 | Rose | G10L 19/24 |
| 9,824,442 B2 * | 11/2017 | Zhai | G06T 7/0012 |
| 10,043,251 B2 * | 8/2018 | Huang | G06T 5/20 |
| 10,325,346 B2 * | 6/2019 | Oztireli | G06T 3/40 |
| 2014/0270543 A1 * | 9/2014 | Zhang | H04N 5/23229 382/209 |

* cited by examiner

*Primary Examiner* — Amir Alavi
(74) *Attorney, Agent, or Firm* — Idea Intellectual Limited; Margaret A. Burke; Sam T. Yip

(57) ABSTRACT

A method and apparatus for converting a standard dynamic range (SDR) video to a high dynamic range (HDR) video. The conversion is adaptive and takes both spatial and temporal information of a current frame and previous frames into consideration such that the majority of pixels falls into the most sensitive regions of human eyes in the target dynamic range, while at the same time, the continuity of luminance is maintained in temporal domain to prevent flickering.

12 Claims, 5 Drawing Sheets

METHOD AND APPARATUS FOR CONVERTING LOW DYNAMIC RANGE VIDEO TO HIGH DYNAMIC RANGE VIDEO

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to digital image and video processing and conversion of dynamic ranges of images and videos, and more particularly methods for enhancing standard dynamic range images and videos to high dynamic range images and videos.

BACKGROUND OF THE INVENTION

In the past, due to the limitations of the camera and monitor systems, most videos were captured in low dynamic ranges as relative to the human perceptual sensitivity and encoded as standard dynamic range (SDR) videos. However, the rapid development of the high dynamic range (HDR) display technology has driven the needs of HDR content. Typical HDR video formats include SMPTE-2084, Dolby Vision, HLG, and HDR10+. Various image and video conversion methods have been developed to convert the mass existing SDR videos to HDR videos. For example, U.S. Pat. Nos. 8,948,537, 8,824,829, 8,582,913, and 8,233,738 disclose various methods for enhancing the input low dynamic range image to produce image data that have higher dynamic range in a real-time implementation. U.S. Pat. No. 8,265,378 discloses how to convert and represent image data from lower bit depth to higher bit depth for rendering HDR image data that are typically coded in 10 bits to 12 bits, instead of 8 bits for SDR image data. U.S. Pat. No. 8,050,512 discloses a conversion performed during the displaying process, where the conversion does not depend on other images. In U.S. Pat. No. 7,573,533, an adaptive contrast enhancement method by generating the transfer curves is proposed.

Human eyes are highly adaptive to a wide range of luminance levels. Human visual perception adjusts automatically according to the target display for comfortable viewing experience. It is essential to utilize the maximum dynamic range of the target display without losing details, and at the same time present a majority of the content at a luminance level that is most sensitive to human eyes. Thus, the conversion from a SDR video to a HDR video is actually an enhancement of the dynamic range from SDR to HDR. The perceptual responses of human eyes to different dynamic ranges and colors are different. It would be difficult to find a universal mapping for all pixels in a video to facilitate a pleasant perceptual viewing experience after the video is converted to HDR. Obviously, using a static conversion, in which a universal mapping function is used for the whole video without taking the spatial and temporal characteristics of the video into account, is not the optimal way in most cases. For instance, a static conversion may result in overly bright HDR images from some bright SDR images or overly dark HDR images from some dark SDR images. An adaptive conversion based on the spatial statistics of the video may do a better job. However, the adaptive conversion with only spatial information may result in loss of continuity of luminance changes from frame to frame due to the different spatial statistics of individual frames. Except for screen change, such adaptive conversion may introduce flickering effect.

SUMMARY OF THE INVENTION

It is an objective of the present invention to provide a method for converting a standard dynamic range (SDR) video to a high dynamic range (HDR) video. The conversion is adaptive and takes both spatial and temporal information of a current frame and previous frames into consideration such that the majority of pixels falls into the most sensitive regions of human eyes in the target dynamic range, while at the same time, the continuity of luminance is maintained in temporal domain to prevent flickering. Pleasant visual perceptual experience can then be facilitated. It is a further objective of the present invention to provide more freedom in adjusting the conversion pixel by pixel using the spatial information, as well as adjusting the conversion smoothly in time domain using the temporal information.

In accordance to one embodiment of the present invention, the method for converting a SDR video to a HDR video comprises: generating breathing parameters of a current frame from temporal information and spatial information of the current frame and one or more previous frames of a first dynamic range video; determining one or more mapping functions according to the generated breathing parameters of the current frame and one or more spatial criteria; determining one or more weights for each pixel of the current frame that correspond to the determined mapping functions; and converting a pixel of the current frame to a converted pixel according to the determined mapping functions and corresponding weights; and repeating the conversion for all pixels of the current frame to form a converted frame in the second dynamic range video.

BRIEF DESCRIPTION OF THE DRAWINGS

Embodiments of the invention are described in more detail hereinafter with reference to the drawings, in which.

DETAILED DESCRIPTION

In the following description, conversion methods for enhancing the dynamic range of a video are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
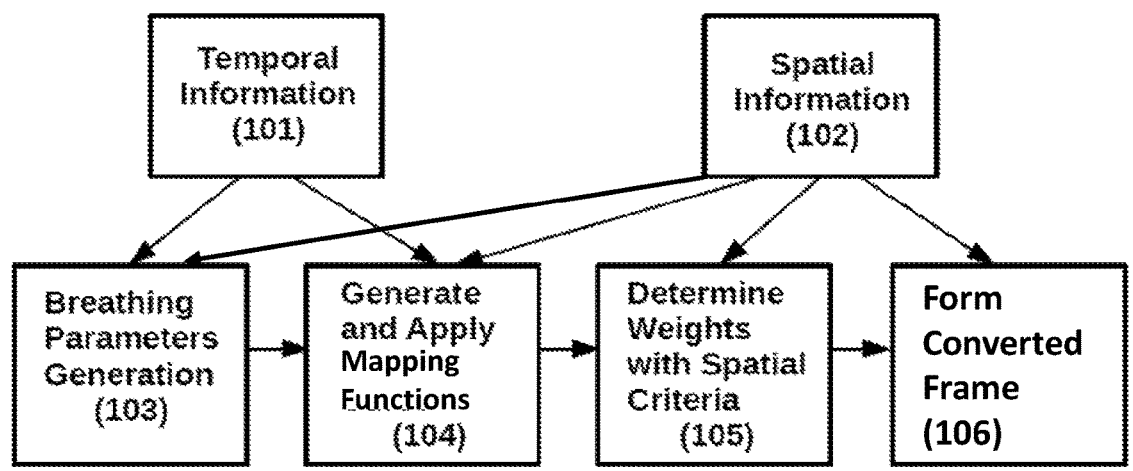
FIG. 1 illustrates a block diagram of the conversion method according to one embodiment of the invention.

FIG. 1 shows a flowchart of a method for converting a SDR video to a HDR video according to one embodiment of the present invention. The method comprises the: generating breathing parameters 103 of a current frame from temporal information 101 and spatial information 102 of the current frame and one or more previous frames of the SDR video; determining one or more mapping functions 104 according to the generated breathing parameters of the current frame and one or more spatial criteria; determining one or more weights 105 for each pixel of the current frame that correspond to the determined mapping functions; and converting a pixel of the current frame to a converted pixel according to the determined mapping functions and corresponding weights; and repeating the conversion for all pixel of the current frame to form a converted frame 106 in the HDR video.

Figure 2:
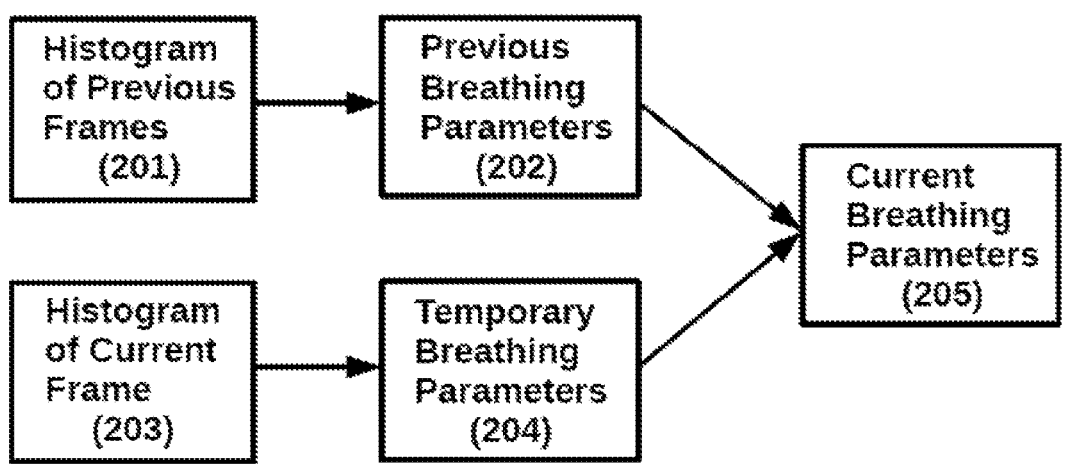
FIG. 2 illustrates a block diagram of the step of generating the breathing parameters according to one embodiment of the invention.

FIG. 2 shows how the breathing parameters are generated according to one embodiment of the present invention. A histogram 203 or a cumulative frequency curve of pixel values, such as luminance, chrominance, any one or combination of red, green, and Blue (RGB) channels, or any post-processing results based on any one or combination of the RGB channels, of the current frame is analyzed and transformed to temporary breathing parameters 204 of the current frame. Previous breathing parameters 202, which were extracted from histograms or cumulative frequency curves of previous frames 201, are retrieved. The temporary breathing parameters 204 and previous breathing parameters 202 are then combined to form current breathing parameters 205 for the current frame. Preferably, the current breathing parameters of the current frame may be obtained by using a temporal function to calculate a weighted sum of the temporary breathing parameters of the current frame and the breathing parameters of previous frames.

It should be noted that the breathing parameters derived solely from the current frame are only temporary breathing parameters. The difference between breathing parameters of the current frame and previous frames is controlled by the temporal function and restricted to below a threshold to maintain continuity. The temporal function may be a linear function along a temporal domain. As the algorithm, in the process steps of determining the mapping functions and determining the weights for each pixel, may use the breathing parameters as a source of temporal information, the continuity of the breathing parameters can be propagated to the whole conversion process.

Figure 3:
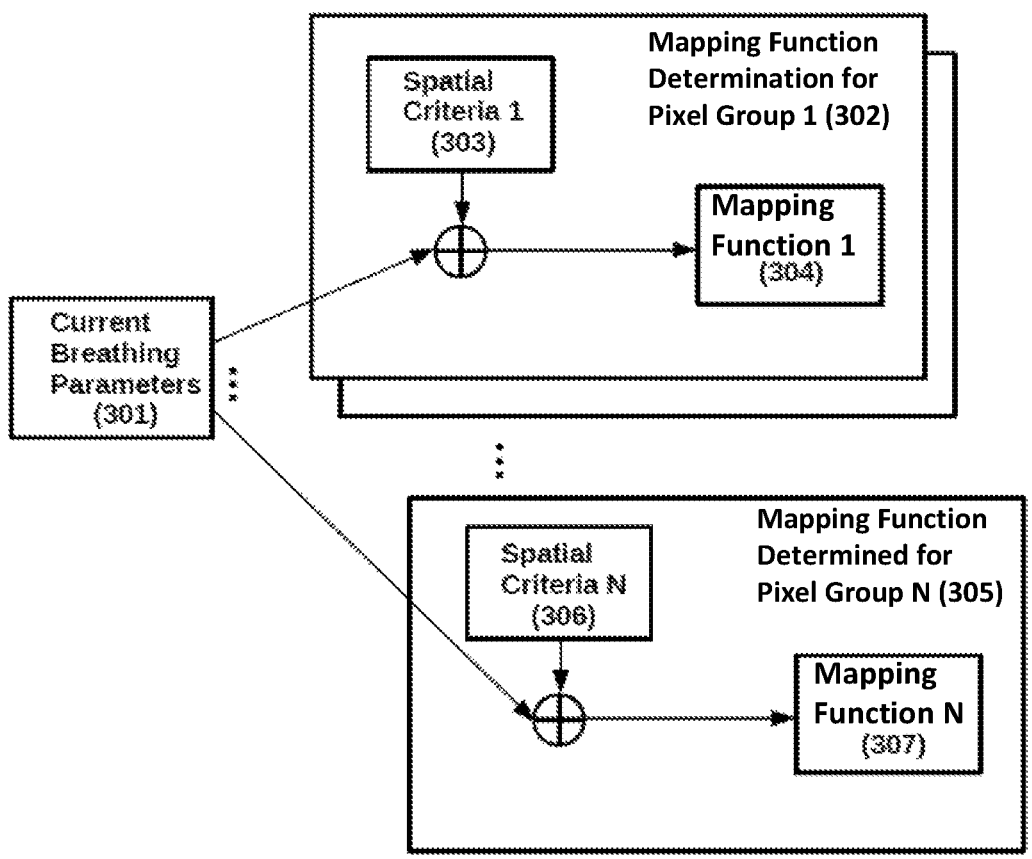
FIG. 3 illustrates a block diagram of the step of determining the mapping functions according to one embodiment of the invention.

FIG. 3 shows how the mapping functions are determined according to one embodiment of the invention. A set of spatial criteria 303 . . . 306 are applied on the current breathing parameters 301 of the current frame to estimate the percentages of which the spatial criteria are satisfied by the current frame and cluster the pixels of the current frame into N pixel-groups depending on whether any one of the spatial criteria and which spatial criterion is satisfied by each pixel. The mapping functions 304 . . . 307 are then determined for the pixel-groups 302 . . . 305 according to the satisfied spatial criteria. Various approaches can be used to define the spatial criteria, such as skin tone detection, high saturation color detection or any other machine learning methods.

A multiple number of mapping functions may be used to construct an N-dimensional model as shown below:

$$M_{conversion} = w_1 M_1 + w_2 M_2 + \ldots + w_N M_N,$$

where $M_{conversion}$ is the N-dimensional conversion model, $M_1 \ldots M_N$ are the independent mapping functions, and $w_1 \ldots w_N$ are the weights corresponding to the mapping functions and also representing the suitability of a pixel to the corresponding mapping functions, and N representing the number of spatial criteria taken into consideration. The N-dimensional model may be a linear model to simulate a perfect conversion, with the mapping functions being the vectors.

The mapping functions are designed and generated so as to match the characteristics of different sets of pixels, depending on the luminance and color statistics, as well as the dynamic ranges of the SDR video and HDR video. These mapping functions can also be dependent on the breathing parameters, which contain the temporal and spatial information of the frames. These mapping functions can be independent from each other, such that the conversion model may cover as much scenarios as possible. Typically, the mapping functions may be non-deceasing convex functions. In addition to the statistical information, various spatial criteria are used in generating the mapping functions which can model different scenarios. Different spatial criteria may be applied to derive different sets of mapping functions for different groups of pixels with different pixel characteristics. For example, the brightness of bright pixels can be suppressed by applying a less steep mapping function, whereas the brightness of dark pixels can be increased by applying a steep mapping function.

Figure 4:
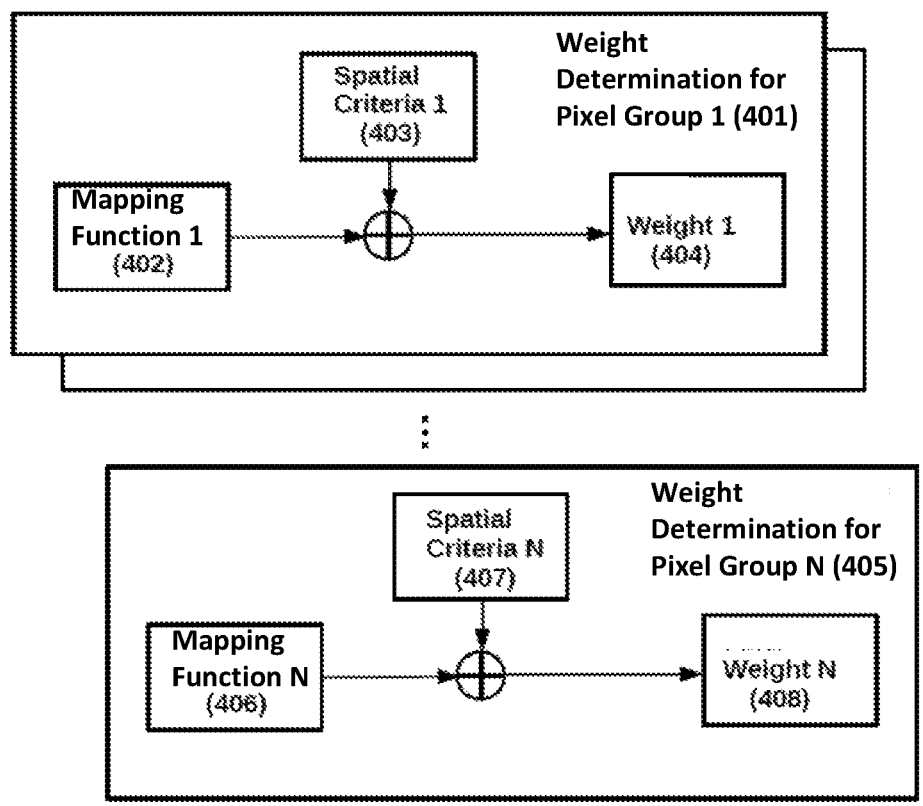
FIG. 4 illustrates a block diagram of the step of determining weights according to one embodiment of the invention.

FIG. 4 illustrates how the weights are determined. A same set of spatial criteria 403 . . . 407 as those used in determining the mapping functions are applied to estimate the suitability of each of pixels to each of the mapping functions 402 . . . 406. The respective weights 404 . . . 408 for each pixel to each of the mapping functions are then determined according to the respectively estimated suitability of the pixel to each of the mapping functions. It should be noted that the mapping functions are frame dependent, which means that there are N mapping functions for each frame in total, while the weights are pixel dependent, which means that for each pixel, there are N weights corresponding to N mapping functions, and totally there are N*(number of pixels in the frame) weights for each frame. This is equivalent to clustering the pixels into different groups and applying different mapping functions to different pixel-groups.

In general, the value indicating whether a pixel falls into a pixel-group can be a soft decision ratio to ensure smooth transition between adjacent pixels. They can be continuous ratios ranged between 0 and 1 after normalization. In this embodiment, when the mapping functions are generated and applied, this soft decision ratio, namely the weight for each mapping function, is determined by the pixel characteristics. Each pixel is covered by at least one pixel-group. In other words, all pixels are covered by the union of the different groups of pixels corresponding to the different mapping functions. The conversion process not only uses the spatial and temporal information from the breathing parameters to generate the mapping functions, but also uses the spatial information of the pixels to determine the weights. Therefore, the conversion and combination are in a more smooth and continuous way in spatial domain.

Figure 5:
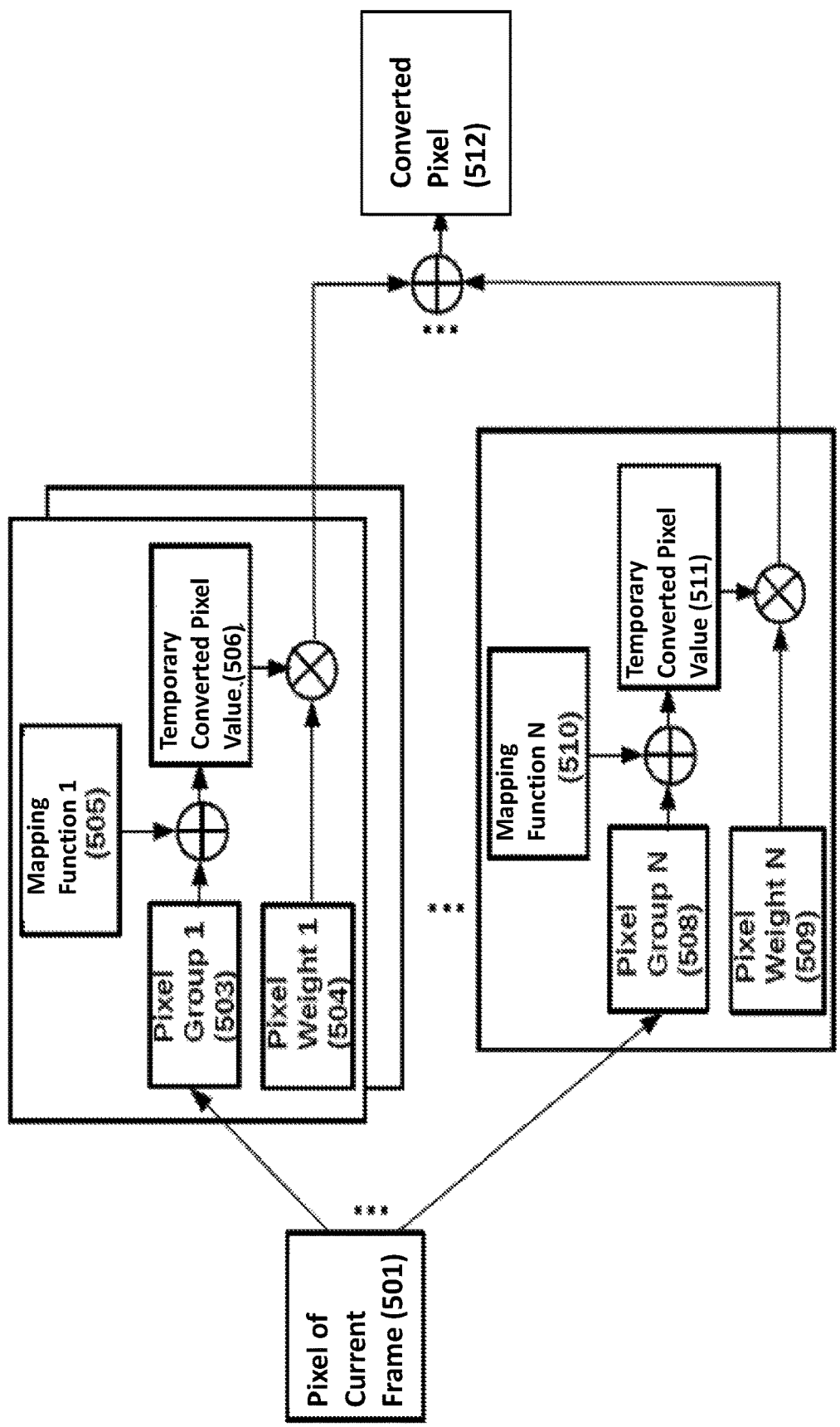
FIG. 5 illustrates a block diagram of the step of converting the pixel values with the determined mapping functions and weights according to one embodiment of the invention.

FIG. 5 illustrates how the mapping functions are applied on the current frame to obtain a converted frame in the HDR video. A pixel 501 of the current frame are converted to one or more temporary converted pixel values 506 . . . 511 with the mapping functions 505 . . . 510 corresponding to pixel-groups 503 . . . 508 respectively. Then, weighted sums of the temporary converted pixel values are calculated with the corresponding weights 504 ... 509 to obtain a converted pixel 512 which will be used to construct the HDR video frame. In other words, the converted frame is a weighted sum of converted pixel-values passing through different mapping functions, where the weights are the soft decision ratios determined in previous steps. Instead of using the mapping functions, the pixel-groups may also be converted through multiplying a constant, wherein the constant is an effective gain of applying the mapping functions on the maximum value of the pixels.

The method and system for enhancing the dynamic range of a video may be implemented in high definition televisions, mobile or personal computing devices (e.g. "tablet" computer, laptop computer, and personal computer) or user terminals having built-in or peripheral electronic displays, or computer processors having data connectivity to any device having built-in or peripheral electronic displays, and having image processing electronics specifically configured to execute machine instructions; wherein the specifically configured image processing electronics may comprise one or more of general purpose or specialized computing devices, computer processors, or electronic circuitries including, but not limited to, digital signal processors (DSP), application specific integrated circuits (ASIC), field programmable gate arrays (FPGA), and other programmable logic devices. The method and system may also comprise the use of and various forms of computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for converting a first dynamic range video to a second dynamic range video, comprising providing image processing electronics configured to:
   receive the first dynamic range video;
   generate one or more breathing parameters of a current frame from temporal information and spatial information of the current frame and one or more previous frames of the first dynamic range video;
   determining one or more mapping functions according to the generated breathing parameters of the current frame and one or more spatial criteria;
   determining one or more weights for each pixel of the current frame corresponding to the determined mapping functions;
   converting a pixel of the current frame to a converted pixel according to the determined mapping functions and corresponding weights; and
   repeating the conversion for all pixels of the current frame to form a converted frame in the second dynamic range video.

2. The method of claim 1, wherein the spatial information of the current frame includes one or more of distributions of luminance, chrominance, red, green, and blue (RGB) channels, and combinations thereof, post-processing results based on one or more of the RGB channels and combinations thereof of the current frame.

3. The method of claim 1, wherein the mapping functions are non-deceasing convex functions.

4. The method of claim 1, wherein the generation of the breathing parameters of the current frame comprises:
   retrieving one or more previous breathing parameters of the previous frames;
   creating a histogram or cumulative frequency curve for the spatial information of the current frame;
   transforming the histogram or cumulative frequency curve into temporary breathing parameters of the current frame; and
   generating the current breathing parameters of the current frame by combining the previous breathing parameters of the previous frames and the temporary breathing parameters of the current frame with a temporal function so as to control the difference between the breathing parameters of the current frame and the previous frames to below a threshold.

5. The method of claim 4, wherein the temporal function is a linear function along a temporal domain.

6. The method of claim 1, wherein the determination of the mapping functions comprises:
   applying one or more spatial criteria on the current breathing parameters of the current frame to estimate one or more percentages of which the spatial criteria are satisfied by the current frame;
   clustering the pixels of the current frame into one or more pixel-groups depending on whether any one of the spatial criteria and which spatial criterion is satisfied by each pixel; and
   determining the mapping functions for each of the pixel-groups according to the satisfied spatial criteria.

7. The method of claim 6, wherein the pixels satisfying one of the spatial criteria are pixels of a skin tone color.

8. The method of claim 6, wherein the pixels satisfying one of the spatial criteria are pixels of a high saturation color.

9. The method of claim 1, wherein the determination of the weights comprises:
   applying the spatial criteria to estimate the suitability of each of the pixels to each of the mapping functions; and
   determining the respective weights for each pixel corresponding to each of the mapping functions, according to the estimated suitability.

10. The method of claim 1, wherein the conversion of a pixel of the current frame to a converted pixel comprises:
    mapping a pixel of the current frame to one or more temporary converted pixel values with the mapping functions; and
    calculating a weighted sum of the temporary converted pixel values with the weights corresponding to the mapping functions to obtain a converted pixel in the converted frame in the second dynamic range video.

11. The method of claim 10, wherein the conversion of the pixel-groups comprises multiplying a constant instead of using the mapping functions, wherein the constant is an effective gain of applying the mapping functions on the maximum value of the pixels.

12. An apparatus for converting a first dynamic range video to a second dynamic range video, configured to:
- receive the first dynamic range video;
- generate one or more breathing parameters of a current frame from temporal information and spatial information of the current frame and one or more previous frames of the first dynamic range video;
- determining one or more mapping functions according to the generated breathing parameters of the current frame and one or more spatial criteria;
- determining one or more weights for each pixel of the current frame corresponding to the determined mapping functions;
- converting a pixel of the current frame to a converted pixel according to the determined mapping functions and corresponding weights; and
- repeating the conversion for all pixels of the current frame to form a converted frame in the second dynamic range video.

* * * * *